United States Patent
Duffin, Jr. et al.

(10) Patent No.: US 6,190,581 B1
(45) Date of Patent: Feb. 20, 2001

(54) DEHYDRATED ANTIMONATE/POLYMER PELLETIZING PROCESS

(75) Inventors: Robert J. Duffin, Jr., West Chester, PA (US); Irving Touval, Sparta, NJ (US)

(73) Assignee: Laurel Industries, Inc., Cleveland, OH (US)

( * ) Notice: Under 35 U.S.C. 154(b), the term of this patent shall be extended for 0 days.

(21) Appl. No.: 08/241,888

(22) Filed: May 12, 1994

(Under 37 CFR 1.47)

(51) Int. Cl.[7] .......................... C09K 21/02; C09K 21/08; C08K 3/24
(52) U.S. Cl. .......................... 252/609; 252/604; 252/610; 524/410; 524/411; 524/412
(58) Field of Search ..................... 524/410, 411, 524/412; 252/607, 609, 604, 610

(56) References Cited

U.S. PATENT DOCUMENTS

| | | | |
|---|---|---|---|
| 3,892,667 | 7/1975 | Touval | 252/8.1 |
| 4,035,333 | 7/1977 | Kamada et al. | 260/40 |
| 4,298,517 * | 11/1981 | Sandler | 524/220 |
| 4,362,658 | 12/1982 | Contin | 252/609 |
| 4,786,663 | 11/1988 | Miyashita et al. | 524/410 |
| 4,983,660 | 1/1991 | Yoshida et al. | 524/369 |
| 5,034,439 | 7/1991 | Breitenfellner et al. | 524/94 |
| 5,115,010 | 5/1992 | Saki et al. | 524/410 |
| 5,177,132 | 1/1993 | Takahashi et al. | 524/114 |
| 5,258,434 | 11/1993 | Hanabusa | 524/310 |

FOREIGN PATENT DOCUMENTS 83995   10/1990   (JP) .

OTHER PUBLICATIONS

Antimony Flame Retardants—I. Touval May/Jun. 1985—Plastics Compounding p. 106–117.

* cited by examiner

*Primary Examiner*—Joseph D. Anthony
(74) *Attorney, Agent, or Firm*—Anne E. Brookes

(57) ABSTRACT

A dehydrated mixture of hydrated sodium antimonate and ionomer polymer flame retard a polymer or resin composition such as film, fiber, electrical connection and molded part. From 10 to 90 parts sodium antimonate containing 3% moisture mixed with 10 to 90 parts ionomer polymer or polyethylene or ethylene vinyl acetate are added to a single screw vented extruder to produce pellet concentrate with a 0.1% moisture content for flame proofing PET. A composition may be prepared in a single or twin screw extruder or in a high shear blender in the presence of glass fiber by adding a dehydrated mixture of an alkyl tertabromophtalate and sodium antimonate and brominated polystyrene to polyethylene terephthalate or polybutylene terephthalate. A preferred temperature range for dehydration of hydrated sodium antimonate in the presence of a polymer is between 150° C. and 250° C.

32 Claims, No Drawings

DEHYDRATED ANTIMONATE/POLYMER PELLETIZING PROCESS

FIELD OF THE INVENTION

The invention relates to flame proofed or fire retarded polymer and resin compositions including polyester resins such as polyethylene terephthalate (PET) and polybutylene terephthalate (PBT). In particular flame retarding concentrates or pellets to be added to PET and PBT are prepared from hydrated sodium antimonate and at least one polymer.

BACKGROUND OF THE INVENTION

A wide variety of flame proofing or fire retarded polymer compositions are known. In the case where the polymer is a polyester such as polyethylene terephthalate (PET) or polybutylene terephthalate (PBT) it was known to flame retard with brominated polystyrene and an antimony compound. It was further known that a dry rather than a wet or hydrated antimony compound was required for addition to PET or PBT. Japanese Patent Application No. 64-83995 (TEIJIN LTD.) discloses a flame retardant composition of brominated polystyrene with an auxiliary antimony compound and a brominated dioctyl phthalate.

Other patents relating to flame proofing and fire retarding compositions and the state of the art include: U.S. Pat. No. 3,723,139; U.S. Pat. No. 3,816,367; U.S. Pat. No. 3,892,667; U.S. Pat. No. 3,897,389; U.S. Pat. No. 3,951,905; U.S. Pat. No. 4,035,333; U.S. Pat. No. 4,338,243; U.S. Pat. No. 4,362,658; U.S. Pat. No. 4,713,407; U.S. Pat. No. 4,729,854; U.S. Pat. No. 4,786,663; U.S. Pat. No. 4,814,130; U.S. Pat. No. 4,983,660; U.S. Pat. No. 5,021,495; U.S. Pat. No. 4,034,439; U.S. Pat. No. 5,115,010; U.S. Pat. No. 5,177,132 and U.S. Pat. No. 5,258,434.

Yet in spite of what was previously known concerning useful means for fire proofing or flame retarding polyester and polymer compositions, a need still existed to provide a means to use lower amounts or employ simplified processes than had previously been used.

SUMMARY OF THE INVENTION

It is an object of the invention to provide a flame retarding concentrate suitable to add to a polymer and/or resin composition comprising dehydrated sodium antimonate and at least one polymer. Produced in a vented extruder a preferred concentrate in pellet form comprises dehydrated sodium antimonate and a sodium ionomer polymer and an antioxidant to be blended with either PET or glass-filled PET.

A general process for flame retarding a resin or polymer composition comprises the steps:
(1) mixing 10 to 90 parts by weight sodium antimonate having a moisture content of about 2.9% with 10 to 90 parts of a homopolymer or copolymer having a molecular weight greater than 150,000;
(2) processing the antimonate/polymer mixture in a vented or vacuum extruder or high shear blender at a temperature of at least 150° C. to produce a flame retarding concentrate with a moisture content below 0.2%; and
(3) compounding the concentrate in a resin or polymer composition.

A preferred process for flame retarding a polyethylene terephthalate or other resin composition comprises the steps:
(1) dehydrating a mixture of alkyl tertabromophthalate and/or tribromphthalate and brominated polystyrene and hydrated sodium antimonate in an extruder,
(2) adding the dehydrated mixture to the resin composition, and
(3) dispersing through an extruder in the presence of glass fibers to prepare a flame retarded resin composition.

A most preferred process for flame retarding a glass-filled polyethylene terephthalate composition comprises the steps:
(1) dehydrating and pelletizing a mixture of di-2-ethyl hexyl tetrabromophthalate and hydrated sodium antimonate and brominated polystyrene and an antioxidant,
(2) combining the dehydrated pellets with polyethylene terephthalate and glass fiber, and
(3) blending the ingredients to prepare a flame retarded polyethylene terephthalate composition.

DETAILED DESCRIPTION OF THE INVENTION

Antimony compounds have been widely used to flame retard polymeric compositions such as thermoplastic resins. Use of an antimony synergist has at times caused deterioration of the polymer or resin, attributed to pH or the use of hydrated antimony compounds. Antimony compounds have been employed in combination with brominated compounds such as brominated dioctyl phthalate, brominated polystyrene, etc. But in contrast with what had previously been known about such combinations, it has now been discovered that a novel process allows the preparation of a dehydrated concentrate or pellet using hydrated sodium antimonate and at least one polymer at lower temperatures than previously believed to be required. A preferred process in a vented extruder processes a combination of an antioxidant and an alkyl tetrabromophthalate and/or tribromophthalate and brominated polystyrene and sodium antimonate in polyethylene terephthalate and similar polymers and resins and combinations thereof.

Using the process of the invention objectional quantities of water can be removed from hydrated sodium antimonate in the presence of at least one polymer and optionally an antioxidant at a temperature as low as 150° C. What is meant by objectional quantities of water is that when the concentrate is placed within a PBT formulation there is no evidence of hydrolysis of the esters. The anhydrous mixture as a concentrate can be produced as extruded pellets along with an antioxidant in less than five minutes at about 250° C.

While the prior art teaches that temperatures of 600 to 1000° C. are required to remove water of crystallization from sodium antimonate it has been discovered that readily available polymers, such as polyethylene and polypropylene, facilitate dehydration at temperatures below 500° C.

A hydrated sodium antimonate suitable for the practice of the invention is available from Elf Atochem North America, Inc. and others. To be fully effective in the presence of polyethylene terephthalate (PET) it was believed that the water of crystallization had to be removed as was previously known from U.S. Pat. No. 4,786,663 and U.S. Pat. No. 5,258,434. Whereas these references teach that the sodium antimonate needs to be heated above 500° C. for one hour, it has now been discovered that water vapor equivalent to the water of crystallization can be removed at temperatures of about 250° C. in less than five minutes. Removal of water had been monitored by the intensity of peaks at 5.30 and 2.65 A° C. when subjected to x-ray diffraction. As long as the hydrated structure was present the 5.30 peak was just slightly higher than the 2.65 peak, but the decrease in the 2.65 peak to approximately half indicated elimination of the hydrated structure.

But in contrast to the complex methods and high temperature requirements of the prior art, it has now been discovered that water vapor removal can be measured and recorded during the compounding and pelletizing process.

Brominated polystyrene is obtained from Ferro Corp. under the Tradename PYROCHECK* 68PB, while other sources include Great Lakes Chemical and Ethyl Corp. The brominated polystyrene can be dispersed most conveniently in polyethylene terephthalate by the addition of di-2-ethyl hexyl tetrabromophthalate. Other suitable alkyl substitutions for the tetrabromophthalate other than ethyl hexyl are; n-octyl, isooctyl, dimethyl, ethyl heptyl and ethyl octyl. With pellets produced by the process of the invention it was a surprising result to find that a mixture of brominated polystyrene and di-2-ethyl hexyl tetrabromophthalate could be extruded and pelletized below 250° C. with-or without incorporation of an antioxidant. And even more surprising was the discovery that water of crystallization was removed when hydrated sodium antimonate was included in the mixture, even at temperatures as low as 150° C. It appears that the process of the invention involves synergy, since less energy or lower temperatures appear to be required in the production process for the flame retarding concentrate or pellet.

A preferred alkyl tetrabromophthalate is PYRONIL* 45 flame retarding agent (*Registered Trademark of Elf Atochem). Inferior performance is obtained with trisubstituted rather than tetrasubstituted materials in terms of final flame retarding properties since it is a function of degree of bromination. But in terms of functioning to form a synergistic mixture with sodium antimonate and brominated polystyrene it makes no difference if either tri or tetra substituted alkyl bromophthalates are used or mixtures thereof. Thus it might be cost effective to use a lower cost material even if bromination were incomplete giving a range of substitution including mono, di, tri and tetra.

Apparatus suitable for practice of the invention may be a single screw or multiple screw extruder as well as a blender. Vented and vacuum equipment is available from Farrel, Killian Inc., American Leistritz, Werner & Pfleiderer, C. W. Braybender Corp. and others.

Carrier polymers with a molecular weight of at least 150,000 other than ionomer polymers include lower melting polyethylenes, polypropylenes an ethylene vinyl acetate, etc. Whereas temperatures of 250° C. to 350° C. are required with ionomer polymers, it is possible to employ temperatures of 150° C. to 250° C. with polyethylene, polypropylene, etc.

Suitable grades of polyethylene terephthalate are available from DuPont, ICI and Eastman Kodak. Suitable grades of polybutylene terephthalate are available from General Electric, Teijin, etc. Other polymers and resins which can be similarly flameretarded include polyvinyl chloride, polycarbonate, polyamide, polyimide and mixtures of these and other polyolefins and polyacrylates.

The following Procedures and Examples illustrate the practice of the invention which has industrial applicability for flameretardant coatings, films and fibers.

PROCEDURE A

Sodium antimonate available from Elf Atochem and having a 3.0% by weight water content was mixed with SYR-LYN* 8940 ionomer polymer (*DuPont registered trademark) in weight ratios between 10:90 and 90:10. About 10% by weight antioxidant was added-to each of ten test samples. Mixtures within this wide range were then fed into a vented Killian single screw extruder at temperatures between 250° C. and 350° C. for from five to ten minutes and the removal of water vapor was measured during the processing. It was confirmed by gravimetric analysis that the concentrate pellets produced contained no more than 0.1% by weight water.

PROCEDURE B

Three flame retarder masterbatches were prepared which contained concentrations of di-2-ethyl-hexyl tetrabromophthalate that ranged from 7.0 to 15.0% as shown below on a weight basis.

| COMPONENTS | 1 | 2 | 3 |
| --- | --- | --- | --- |
| Brominated Polystyrene | 66.7 | 63.0 | 59.3 |
| 2 Ethyl Hexyl Tetrabromophthalate | 7.4 | 11.1 | 14.8 |
| Hydrated Sodium Antimonate | 25.9 | 25.9 | 25.9 |

The mixture was passed through a 2.54 cm" Killion extruder which had been preheated according to the following profile:

| ZONE 1 | ZONE 2 | ZONE 3 | DIE |
| --- | --- | --- | --- |
| 135° C. | 157° C. | 157° C. | 168° C. |

The extrudate was pelletized and used to flame retard polyethylene terephthalate. The efficacy or water content of the sodium antimonate was determined by measuring the x-ray peaks at 5.25–5.35 A° C. and 2.64–2.66 A° C. and comparing the ratios. The ratio of the 5.25 A° C. peak to the 2.65 A° C. peak of the sodium antimonate was 1.13. The ratio of the same peaks in the masterbatch was 2.5, indicating the water was removed.

PROCEDURE C

The pellets of Procedure A and pelletized masterbatches prepared in Procedure B were then added to a mixture of polyethylene terephthalate both with and without glass fibers. The properties of these formulations were compared to a formulation comprised of the individual components of the masterbatch and the Surlyn* 8940 ionomer required for proper dispersion. (*DuPont registered trademark)

ILLUSTRATIONS OF GLASS FILLED PET COMPOSITIONS
FORMULATION % BY WEIGHT

| COMPONENTS | 1 | 2 | 3 | 4 |
| --- | --- | --- | --- | --- |
| Polyethylene Terephthalate | 52.0 | 54.0 | 54.0 | 54.0 |
| Glass Fiber | 30.0 | 30.0 | 30.0 | 30.0 |
| Brominated Polystyrene | 11.5 | — | — | — |
| Sodium Antimonate | 3.9 | — | — | — |
| SURLYN 8940 | 2.5 | — | — | — |
| IRGANOX 1076 | 0.1 | — | — | — |
| Masterbatch 1 | — | 16.0 | — | — |
| Masterbatch 2 | — | — | 16.0 | — |
| Masterbatch 3 | — | — | — | 16.0 |

The formulations were mixed in a Hobart mixer for 30 seconds. The glass was added after 20 seconds of mixing. The blends were dried overnight at 90° C. The formulations were compounded in an extruder in which the heating profile was set as follows:

| ZONE 1 | ZONE 2 | ZONE 3 | DIE |
|---|---|---|---|
| 240° C. | 262° C. | 271° C. | 273° C. |

The extrudate was pelletized and dried once again at 90° C. before injection molding to form test specimens. Test specimens were prepared with an Arburg Allrounder injection molder.

PROCEDURE D

Sodium antimonate available from Elf Atochem and having a 3.0% by weight water content was mixed with about 1.0% by weight antioxidant and either polypropylene or polyethylene or ethylene vinyl acetate to provide an antimonate/polymer ratio between 20:80 and 80:20. Mixtures were fed into a vented Killian single screen extruder at temperatures between 150° C. and 300° C. for five minutes and the removal of water vapor was measured during the processing. It was confirmed by gravimetric analysis that the concentrate pellets produced contained no more than 0.2% by weight water.

EXAMPLE 1

Using the B and C Procedures a formulation was prepared with the following weight percentages: 58.8% Pyrocheck* 68PB brominated polystyrene, 25.9% hydrated sodium antimonate, 14.3% Pyronil*45 di-2-ethyl hexyl tertabromophthalate, and 1.0% Irganox* 1076 antioxidant (*Registered Trademark Ciba Geigy). A dehydrated mixture was prepared in less than five minutes at 300° F.–500° F. (149° C–260° C.) by passing the mixture through a 2.54 cm vented Killion extruder fitted with a two stage screw. The temperature profile varied from 335° F. (168° C.) at the die to 275° F. (135° C.) at the feed zone. The extrudate was passed through a cooling bath and pelletized into ⅛" (3. mm) pellets.

A comparison of the individual components and the pelletized concentrate was made in glass-filled PET.

| FORMULATION PARTS BY WEIGHT | | |
|---|---|---|
| COMPONENT | CONTROL | INVENTION |
| PET | 1,562 | 1,562 |
| Glass Fiber | 900 | 900 |
| Epon 1009F | 18 | 18 |
| Pyrocheck* 68PB | 330 | — |
| Sodium Antimonate | 115 | — |
| Irganox* 1076 | 5 | — |
| Extrudate Pellets | — | 450 |
| RESULTS | | |
| OXYGEN INDEX | 35.7 | 36.2 |
| UL 94 | V–O | V–O |
| HDT | 193 | 193 |
| SPIRAL FLOW | 45 | 39 |
| TENSILE STRENGTH PSI | 10,620 | 12,520 |
| FLEXURAL STRENGTH PSI | 22,090 | 24,410 |

As shown in the comparative results a significant improvement in tensile and flexural strength is provided via the invention along with the excellent flame retarding characteristics.

EXAMPLE 2

Samples were prepared and tested as in Example 1 except that no glass fiber was added to the PET. In all tests the flame protection provided was greater than would have been expected for the additive effect of sodium antimonate and brominated polystyrene by themselves.

EXAMPLE 3

When an attempt was made to extrude a mixture of brominated polystyrene and hydrated sodium antimonate using Procedure B, it was not possible to obtain useful extrudate pellets which could be added to PET. As a result it was only possible to make the comparison of Example 1 rather than a side by side comparison of extrudates.

EXAMPLE 4

Pellets are prepared as in Procedures A and D except that the apparatus used is a Banbury mixer.

EXAMPLE 5

A fire retarding concentrate is prepared as in Procedure A except that a continuous mixer is used and the carrier polymer is PET.

EXAMPLE 6

Concentrates having final water content below 0.2% were prepared similar to Procedure D using the wet sodium antimonate and four carrier polymers (ionomer polymer, polyethylene, ethylene ethyl acrylate, ethylene vinyl acetate) in three types of apparatus (extruder, continuous, Banbury) using processing temperatures of from 150° C. to 350° C. within times of about 5 minutes. Ratios of sodium antimonate to carrier polymer were varied between 80/20 to 20/80. Smooth removal of water vapor was observed in all instances and a product suitable for use in PET or PBT as well as other less water sensitive polymers and resins was obtained.

Dehydration of sodium antimonate from the initial water content of about 3.0% to the final levels of about 0.2% by weight was determined by gravimetric analysis and DSC (Differential Scanning Calorimetry). Compared to the use of x-ray diffraction results were available in a matter of days rather than more than one month.

With all polymers tested sufficient water was removed at temperatures below 350° C. to match the prior art methods using temperatures of 600 to 1000° C.

What is claimed is:

1. A process for producing a flame proofing or flame retarding concentrate suitable for addition to a polymer or resin composition comprising the steps of dehydrating a mixture of hydrated sodium antimonate having a water content of about 2.9 weight percent, and at least one polymer in a vented or vacuum apparatus or high shear blender at a temperature above 200° C. and below 500° C. to produce the flame proofing or flame retarding concentrate which has a water content of below 0.2 weight percent.

2. The process of claim 1 wherein the polymer is a sodium substituted ionomer polymer.

3. The process of claim 1 where an antioxidant is added to the mixture in an amount of from 0.5 to 1.5% by weight based on the weight of the dehydrated mixture.

4. The process of claim 1 wherein the polymer is ethylene vinyl acetate or ethylene ethyl acrylate or polyethylene or polypropylene.

5. The process of claim 1 wherein the polymer comprises at least one of polyethylene terephthalate and polybutylene terephthalate.

6. The process of claim 1 wherein the apparatus is a vented extruder.

7. The process of claim 6 wherein the polymer is an ionomer polymer and the temperature is between 240 and 350° C.

8. The process of claim 1 wherein the polymer comprises at least one of alkyl tetrabromophthalate, tribromophthalate, brominated polystyrene, polyethylene terephthalate and polybutylene terephthalate.

9. The process of claim 8 where the alkyl tetrabromophthalate is selected from the group consisting of di-2-ethyl hexyl tetrabromophthalate, n-octyl tetrabromophthalate isooctyl tetrabromophthalate dimethyl tetrabromophthalate, ethyl heptyl tetrabromophthalate, and ethyl octyl tetrabromophthalate.

10. The process of claim 9 where the alkyl tetrabromophthalate is di-2-ethyl hexyl tetrabromophthalate and the mixture further contains brominated polystyrene and the temperature is from about 200 to about 250° C.

11. A process for producing a flame proofing or fire retardant pellet comprising the steps: (i) mixing 10 to 90 parts by weight sodium antimonate with a water content of about 2.9% with 10 to 90 parts by weight carrier polymer and 0.5 to 1.5 parts by weight antioxidant to prepare a concentrate precursor; (2) processing the concentrate precursor in a vented or vacuum apparatus at a temperature between 200° C. and 500° C. to remove the majority of the water from the concentrate precursor within at least 30 minutes; and (3) pelletizing the dehydrated concentrate precursor to produce a pellet with a moisture content below 0.2% by weight.

12. The process of claim 11 where the carrier polymer is ethylene vinyl acetate polyethylene, polypropylene or ethylene ethylacrylate.

13. The process of claim 11 were the carrier polymer is PET or PBT.

14. The process of claim 11 where the apparatus is a vented extruder and the carrier polymer is an ionomer polymer.

15. The process of claim 11 where in step (2) the water is removed at a temperature below 350° C. in less than 5 minutes.

16. The process of claim 11 where the temperature is above 200° C. and the water is removed in less than 10 minutes.

17. The process of claim 11 wherein the carrier polymer is a homopolymer or a copolymer having a molecular weight greater than 150,000.

18. The process of claim 11 where in step (2) the vented apparatus is a single screw extruder.

19. The process of claim 18 where the carrier polymer is a sodium ionomer polymer.

20. A process for flame retarding a polymer or resin composition to produce a flame-retarded composition with the steps:

(1) dehydrating a mixture of an alkyl tetrabromophthalate and/or alkyl tribromophthalate and hydrated sodium antimonate and brominated polystyrene at high shear conditions at a temperature between 200 and 500° C. to produce a dehydrated concentrate; and (2) combining the dehydrated concentrate with the polymer or resin in a vented extruder or a high shear blender to produce the flame-retarded composition.

21. The process of claim 20 where in step (1) dehydration takes place at a temperature below 250° C.

22. The process of claim 20 where in step (1) the alkyl tetrabromophthalate is di-2-ethyl hexyl tetrabromophthalate which is added in an amount of up to 15.0% based on the total weight of the mixture and the temperature is between 240 and 273° C.

23. The process of claim 22 where in step (1) an antioxidant is added in an amount of up to 1.5% by weight based on the weight of the mixture.

24. A process for flame proofing a glass-filled polyethylene terephthalate or polybutylene terephthalate composition with the steps:

(1) dehydrating a mixture of an alkyl tetrabromophthalate and/or tribromophthalate and hydrated sodium antimonate and brominated polystyrene at a temperature between 200 and 300° C.;

(2) combining the dehydrated mixture with additional brominated polystyrene, polyethylene terephthalate or polybutylene terephthalate and glass fiber; and (3) blending the ingredients to prepare a flame retarded terephthalate composition.

25. The process of claim 24 where in step (1) dehydration takes place at a temperature below 250° C.

26. The process of claim 24 where in step (3) blending takes place in a high shear blender.

27. The process of claim 24 where the composition comprises from 15 to 35% by weight glass fiber based on the weight of polyethylene and/or polybutylene terephthalate.

28. The process of claim 27 where an antioxidant is added in an amount of 0.5 to 1.5% based on the weight of the dehydrated mixture.

29. The process of claim 24 where in step (1) dehydration takes place at about 250° C. in less than five minutes.

30. The process of claim 29 where di-2-ethyl hexyl tetrabromophthalate comprises up to 15.0% by weight based on the total weight of the mixture.

31. The process of claim 30 where the glass-filled composition is polyethylene terephthalate.

32. The process of claim 30 where the glass-filled composition is polybutylene terephthalate.

* * * * *